(12) United States Patent
Wu et al.

(10) Patent No.: US 7,612,957 B1
(45) Date of Patent: Nov. 3, 2009

(54) VOICE COIL DRIVING AUTO-FOCUS LENS MODULE

(75) Inventors: Han-Chung Wu, Taipei (TW); Chin-Yi Chou, Taipei (TW); San-Woei Shyu, Taipei (TW)

(73) Assignee: E-Pin Optical Industry Co., Ltd., Taipei (TW)

( * ) Notice: Subject to any disclaimer, the term of this patent is extended or adjusted under 35 U.S.C. 154(b) by 0 days.

(21) Appl. No.: 12/422,718

(22) Filed: Apr. 13, 2009

(51) Int. Cl.
*G02B 7/02* (2006.01)
(52) U.S. Cl. ...................... 359/824; 359/819
(58) Field of Classification Search ........... 359/811, 359/813, 814, 815, 819, 822, 823, 824
See application file for complete search history.

(56) References Cited

U.S. PATENT DOCUMENTS 7,499,231 B2 * 3/2009 Shyu et al. ............. 359/824

FOREIGN PATENT DOCUMENTS

| JP | 63247924 | 10/1988 |
|---|---|---|
| JP | 3124292 | 8/2006 |
| JP | 3132575 | 6/2007 |
| TW | M317027 | 8/2007 |
| TW | M318736 | 9/2007 |
| TW | M331687 | 5/2008 |

* cited by examiner

*Primary Examiner*—Timothy J Thompson
(74) *Attorney, Agent, or Firm*—Muncy, Geissler, Olds & Lowe, PLLC (57) ABSTRACT

A voice coil driving auto-focus lens module is disclosed. The voice coil driving auto-focus lens module includes a base, two conductive plates, an insulation spacer, four permanent magnets, a lens holder, an optical lens, a spring set, a coil, and a top cover. The lens holder, the optical lens and the coil form a lens set that moves synchronously while the permanent magnets are fixed on an outer circle of a leaf spring. The spring set includes a coil spring and a leaf spring. By resultant spring force due to extension or compression of the coil spring as well as the leaf spring, together with the electromagnetic force, the lens module moves fast, focuses stably and the tilt of the lens module is reduced.

6 Claims, 11 Drawing Sheets

VOICE COIL DRIVING AUTO-FOCUS LENS MODULE

BACKGROUND OF THE INVENTION

The present invention relates to a voice coil driving auto-focus lens module, especially to a lens module in which an optical lens is driven to move forward and backward for auto-focusing by spring force of spring set as well as electromagnetic force.

The digital cameras or mobile phones with shooting function are disposed with a lens module that drives optical lenses to move along an optical axis for autofocus or zoom. One of the driving mechanisms of the optical lens is voice coil motor (VCM). By applying a current to the coil to generate an electromagnetic field, a driving force is generated by the electromagnetic field and a permanent magnet so as to drive the optical lens. Such design can minimize volume of the lens module so that the VCM has been applied to small-size cameras, camera-equipped cellular phones or web-cameras broadly.

Figure 1:
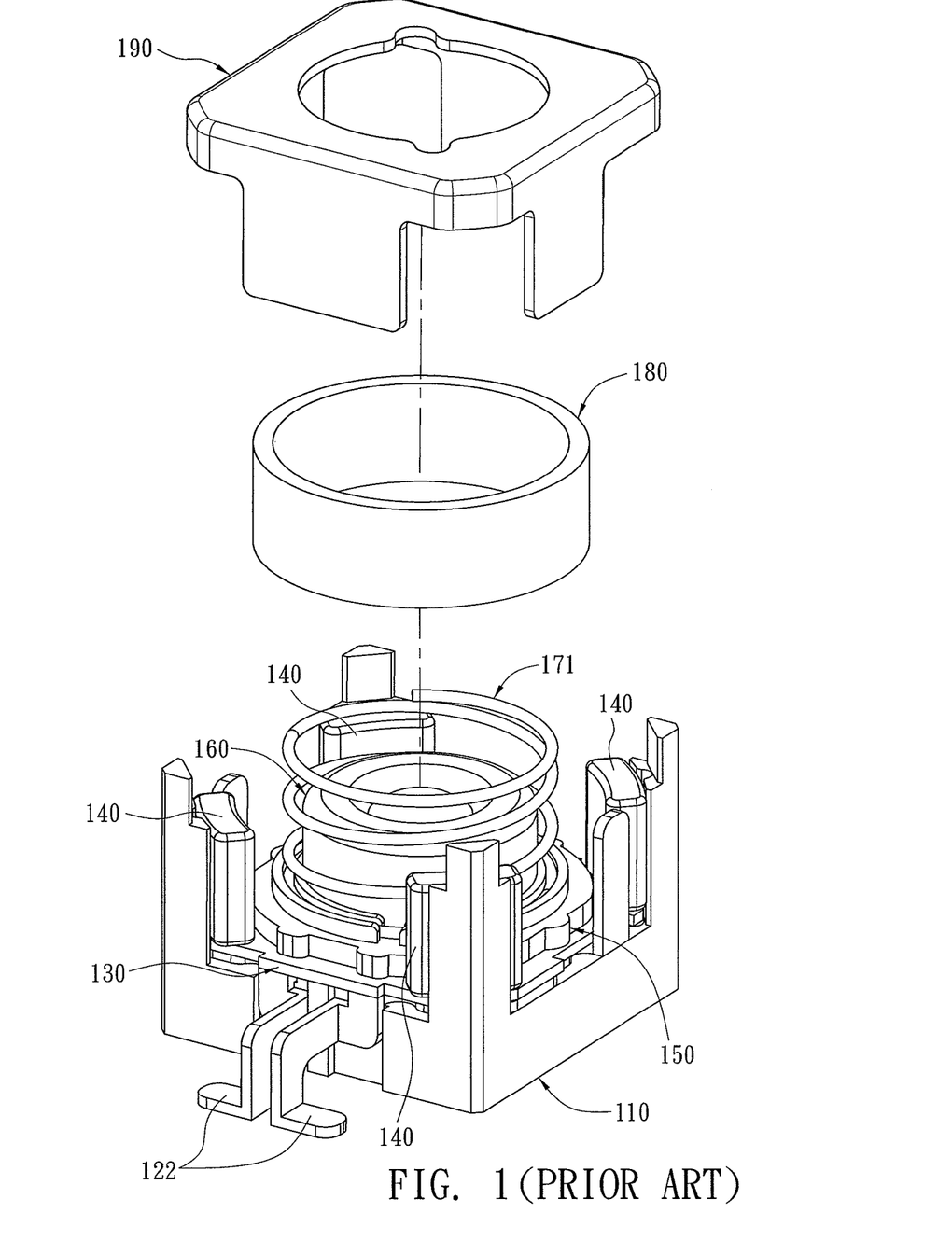
FIG. 1 is a schematic drawing showing a conventional VCM type autofocus lens module with a coil spring.
Figure 2:
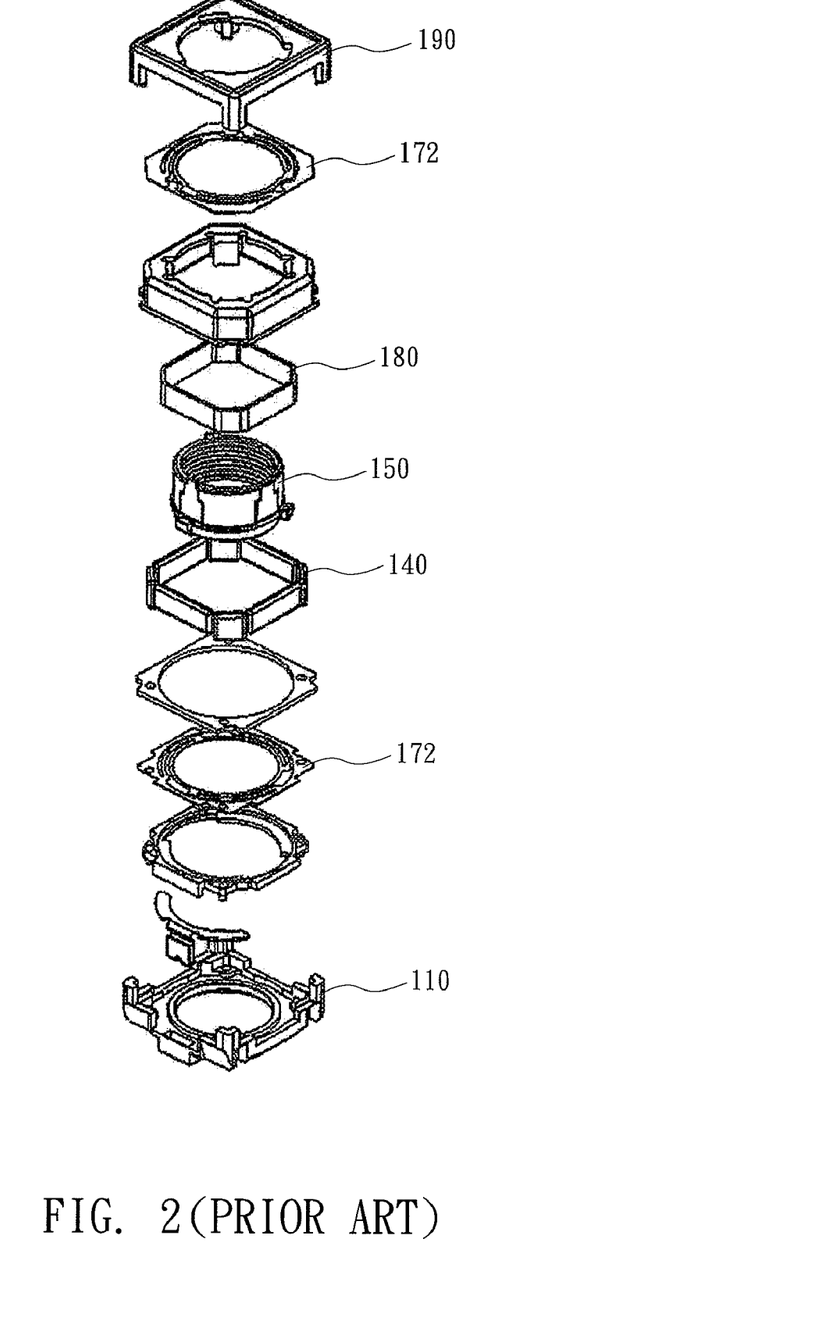
FIG. 2 is a schematic drawing showing a conventional VCM type autofocus lens module with a leaf spring.

A conventional VCM-type autofocus lens module is shown in FIG. 1, as those disclosed in US2008/0013196, U.S. Pat. No. 6,594,450, U.S. Pat. No. 7,145,738, TWM317027, JP3124292, and JP3132575. The VCM-type autofocus lens module mainly includes a bottom cover 110, two conductive plates 122, an insulation spacer 130, four permanent magnets 140, a lens holder 150, an optical lens 160, a coiled spring 171, a coil 180, and a top cover 190. A lens set moving along the optical axis is formed by the lens holder 150, the optical lens 160, and the coil 180. While the coiled spring 171 being used, the coiled spring 171 generates an elastic fore directly and effectively so as to make the lens holder 150 move fast. Yet the lens module may be tilted during the movement so that the requirement of high precision is unable to achieve. Refer to FIG. 2, alternative VCM-type autofocus lens module is disclosed. The lens holder 150 is moved by an elastic force of a leaf spring 172, as prior arts revealed in US2008/0186601, US2006/0181632, TWM331687, TWM318736, and JP63247924. But both the elasticity and extension length of the leaf spring 172 are not so strong so that the movement of the lens module is slower and the requirement of quick focusing is unable to be matched. In some prior arts, even two leaf springs 172 are used so as to overcome the problem of insufficient extension length but the slow movement is still a problem.

Thus there is a need to invent a new design of the lens module without too much modification of the design available now that satisfies the requirements of high precision, quick-focusing and reduced tilt by elasticity force of spring set.

SUMMARY OF THE INVENTION

Therefore it is a primary object of the present invention to provide a voice coil driving auto-focus lens module formed by a base, two conductive plates, an insulation spacer, four permanent magnets, a lens holder, an optical lens, a spring set, a coil, and a top cover. The lens holder, the optical lens and the coil constitute a lens set that moves synchronously while the four permanent magnets are respectively covered and fixed on an outer circle of a leaf spring on four corners of the base. The spring set includes a coil spring and a leaf spring. The coil spring is disposed on an inner or an outer side of the lens holder and is elastically supported between an outer circular flange of the lens holder and the top cover. The leaf spring is disposed on the lens holder. An inner circle of the leaf spring is fixed on a surface of one end of the lens holder while an outer circle of the leaf spring remains fixed. By extension or compression of the two types of springs-coil spring and leaf spring, a resultant spring force is generated. Thereby, the resultant force of spring forces in combination with the electromagnetic force makes the lens module move fast and focuses stably while the tilt of the lens module is reduced.

DETAILED DESCRIPTION OF THE PREFERRED EMBODIMENT

The First Embodiment

Figure 3:
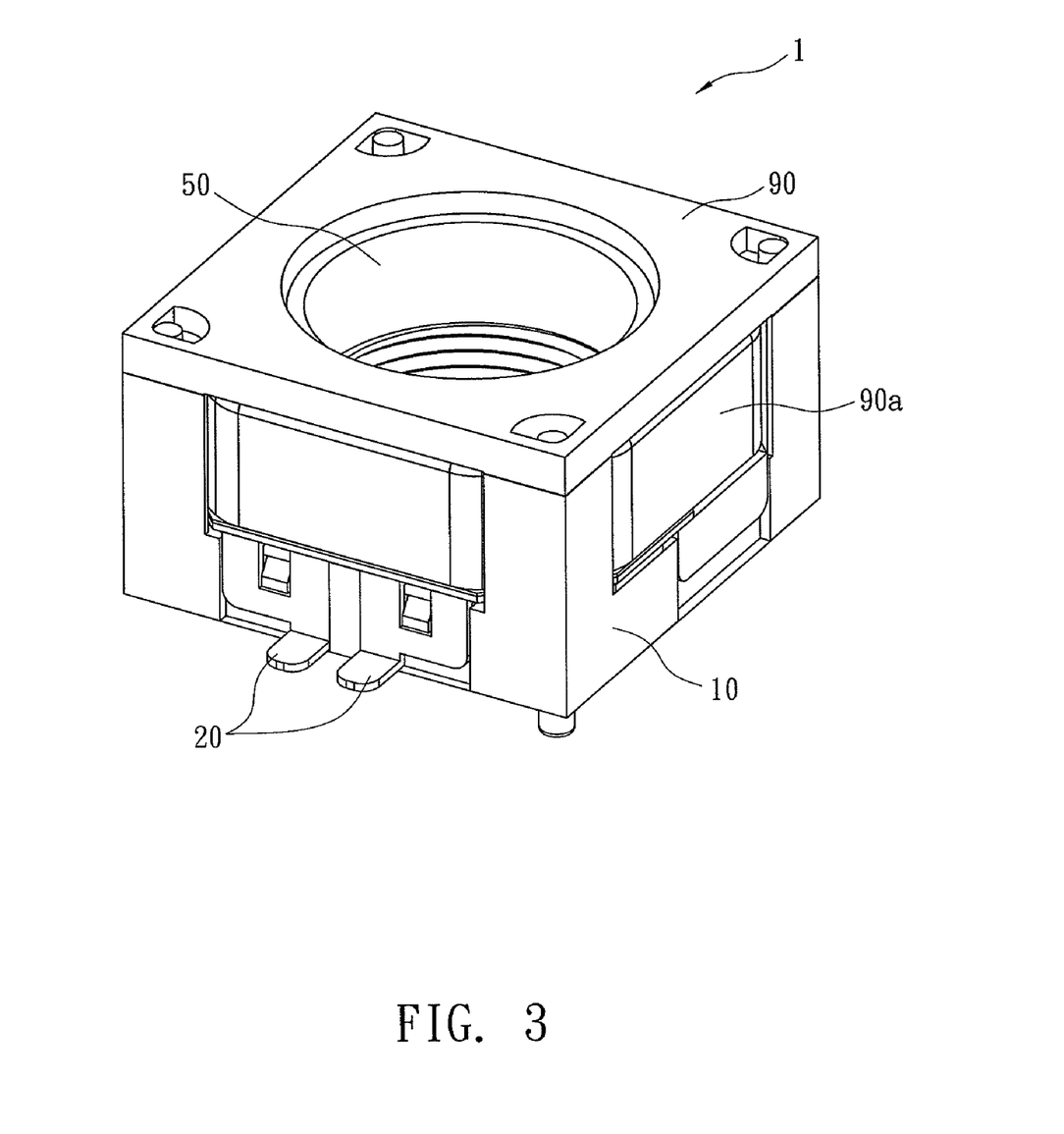
FIG. 3 is a perspective view of an embodiment according to the present invention.
Figure 4:
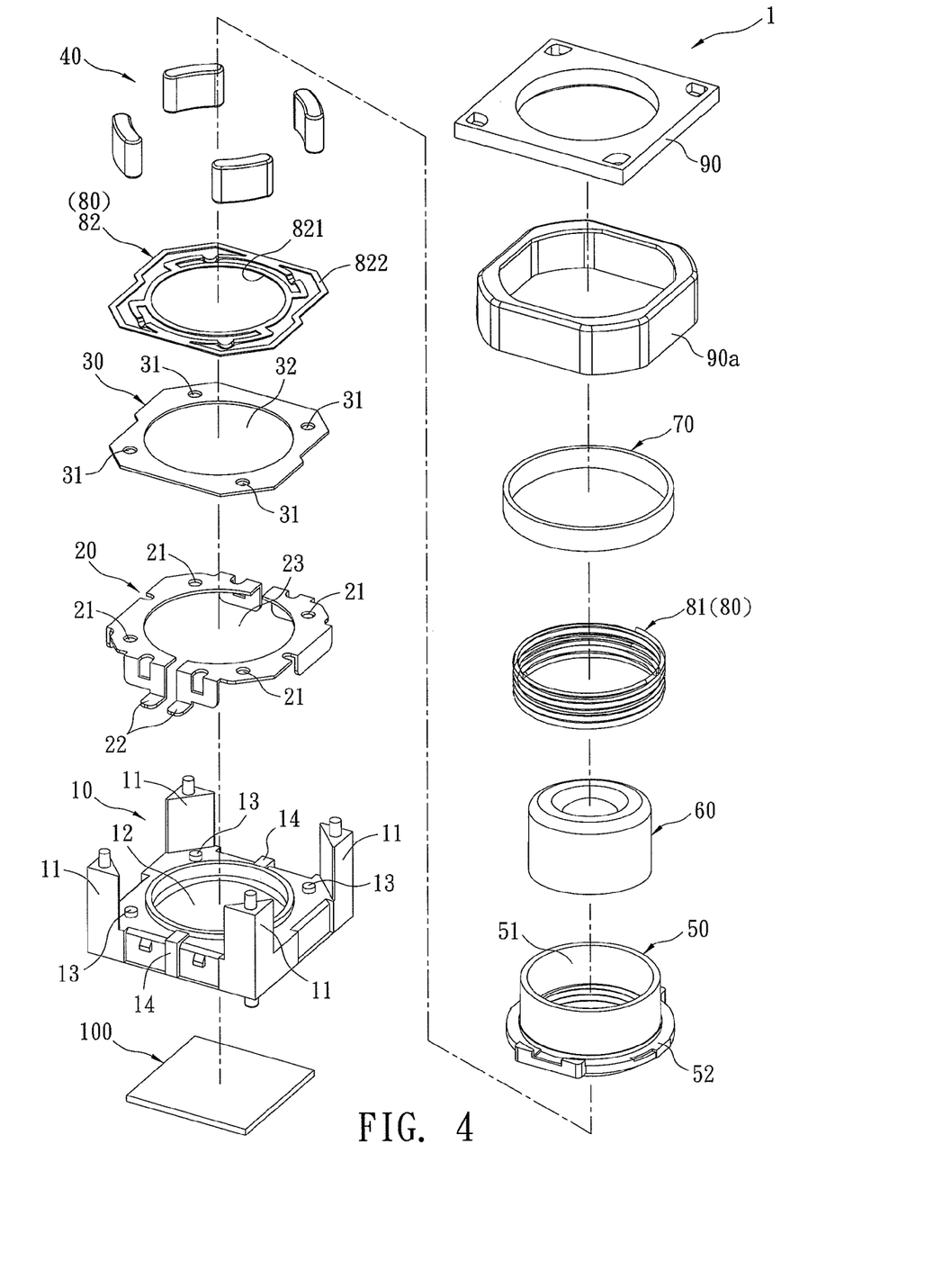
FIG. 4 is an explosive view of the embodiment in FIG. 3 according to the present invention.

Refer to FIG. 3 & FIG. 4, a voice coil driving auto-focus lens module 1 of the present invention consists of a base 10, two conductive plates 20 such as copper plates, an insulation spacer 30, four permanent magnets 40, a lens holder 50, an optical lens 60, a spring set 80, a coil 70, and a top cover 90. The spring set 80 is included a coil spring 81 and a leaf/blade spring 82. The lens holder 50, the optical lens 60 and the coil 70 form a lens set that moves forward/backward between the base 10 and the top over 90 so as to achieve auto-focusing.

Figure 5:
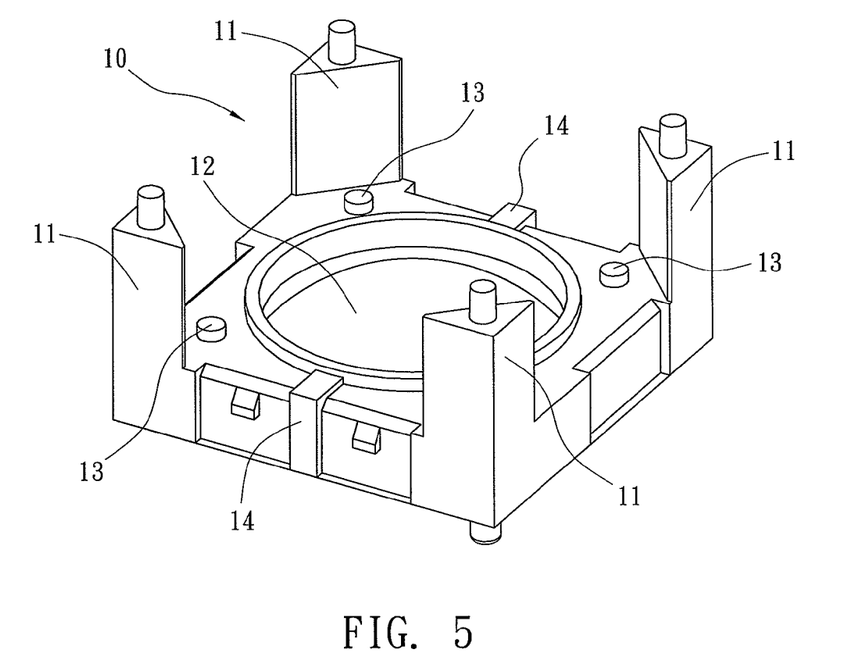
FIG. 5 to FIG. 12 show combination processes of each component of the embodiment in FIG. 3 according to the present invention.
Figure 14:
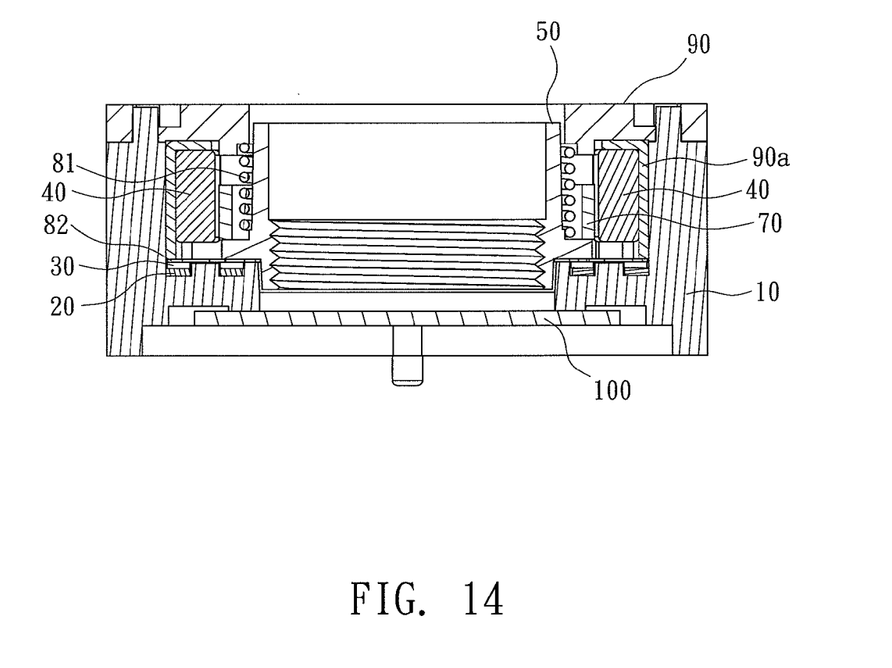
FIG. 14 is a side cross sectional view of the embodiment in FIG. 3 according to the present invention.

Refer to FIG. 4, FIG. 5 & FIG. 14, the base 10 is a rectangular frame with four stands 11 for locking on four corners for assembling with the top cover 90. A central hole 12 on center of the base 10 is used to form an opening for an optical path of the optical lens 60. A plurality of positioning pins 13 and projections 14 for isolation are arranged on inner surface of the base 10. Moreover, an IR cut-off filter 100 is disposed under the central hole 12, as shown in FIG. 4.

Figure 6:
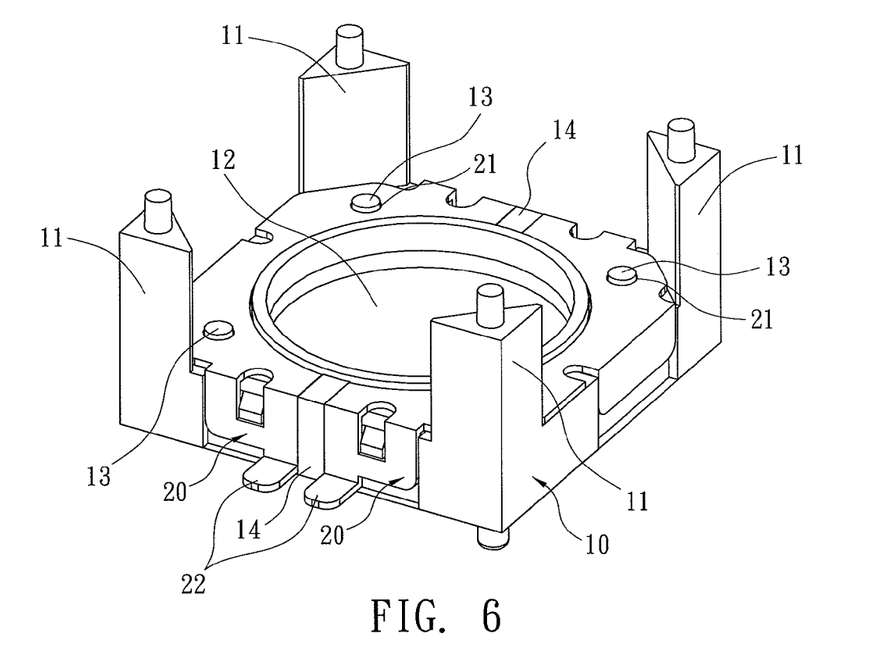

Refer to FIG. 4, FIG. 6 & FIG. 14, the two conductive plates 20 are disposed on the base 10 in insulated status by the combination of the positioning hole 21 with the positioning pins 13 and respectively are connected to different electrodes by a projecting piece 22. A central hole 23 corresponding to the central hole 12 of the base 10 is formed between the two conductive plates 20.

Figure 7:
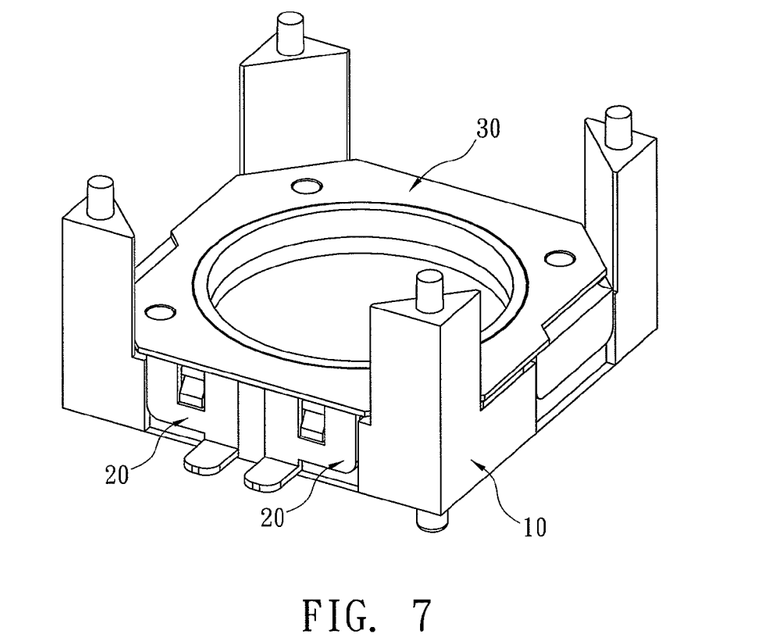

Refer to FIG. 4 & FIG. 7, by positioning holes 31 thereof and corresponding positioning pins 13, the isolation spacer 30 attaches on the two conductive plates 20. Furthermore, the isolation spacer 30 includes a central hole 32 that corresponds to the central holes 12, 23.

Figure 9:
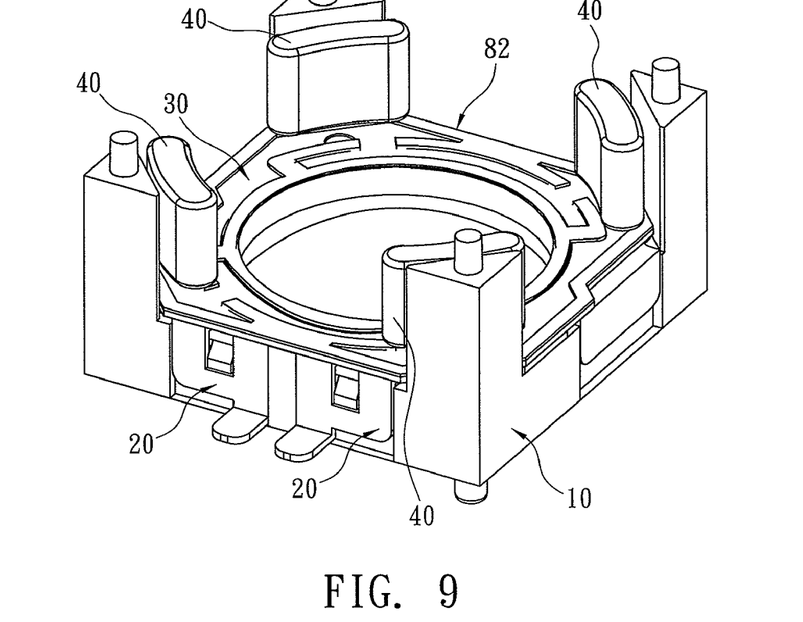

Refer to FIG. 4, FIG. 9 & FIG. 14, the four permanent magnets 40 are in arched symmetrical shape and are respectively disposed on inner side of the four stands 11 of the base 10, being fixed between the top cover 90 and the base 10. In this embodiment, the four permanent magnets 40 are respectively covered and fixed on an outer circle 822 of the leaf spring 82.

Figure 10:
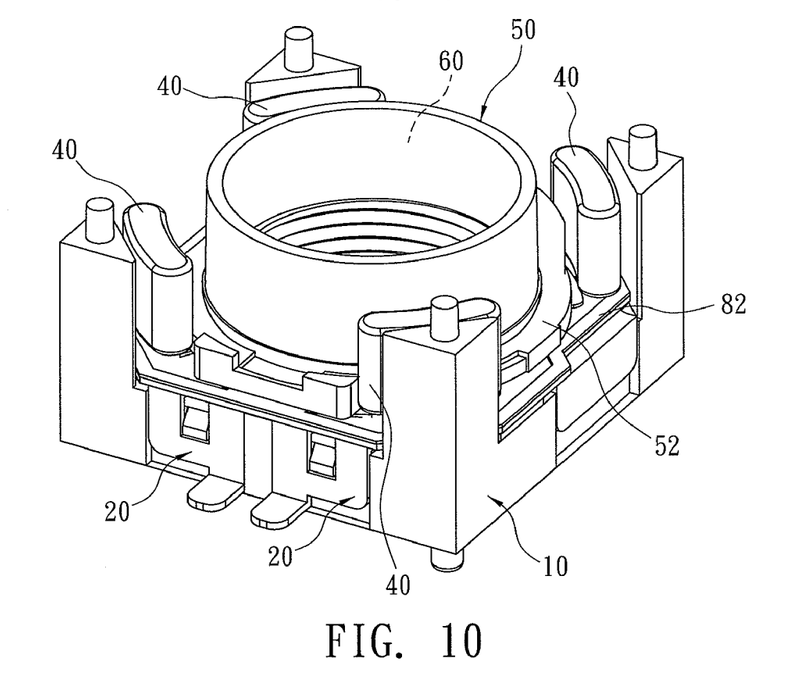

Refer to FIG. 4, FIG. 10 & FIG. 14, the lens holder 50 is arranged on the central holes 12, 23 and an inner circle 821 of the leaf spring 82 is clipped and fixed on an outer surface of a bottom of the e lens holder 50. In this embodiment, the lens holder 50 is a circular body having a central hole 51, and an outer circular flange 52. The optical lens 60 is fastened and fixed in the central hole 51 and there is no limit on the fastening way. It can be threaded or adhered.

Figure 8:
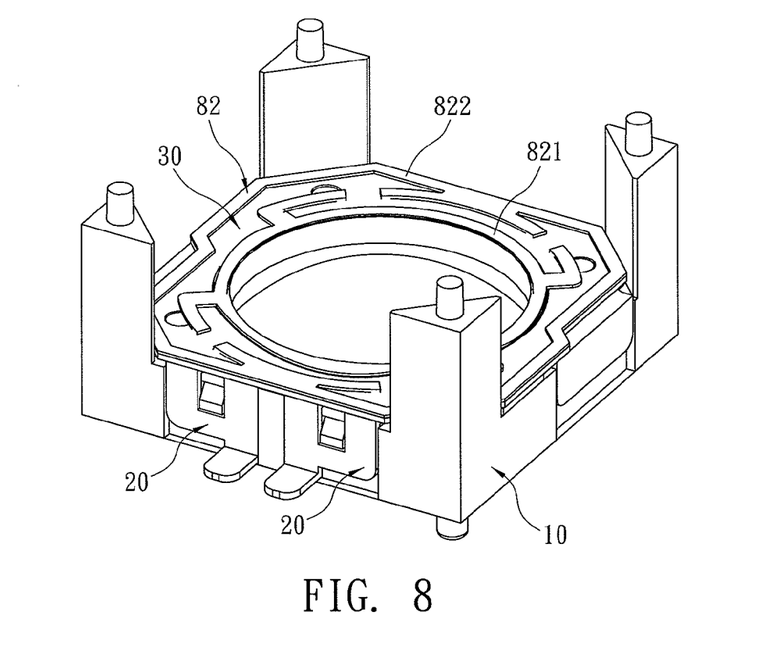
Figure 11:
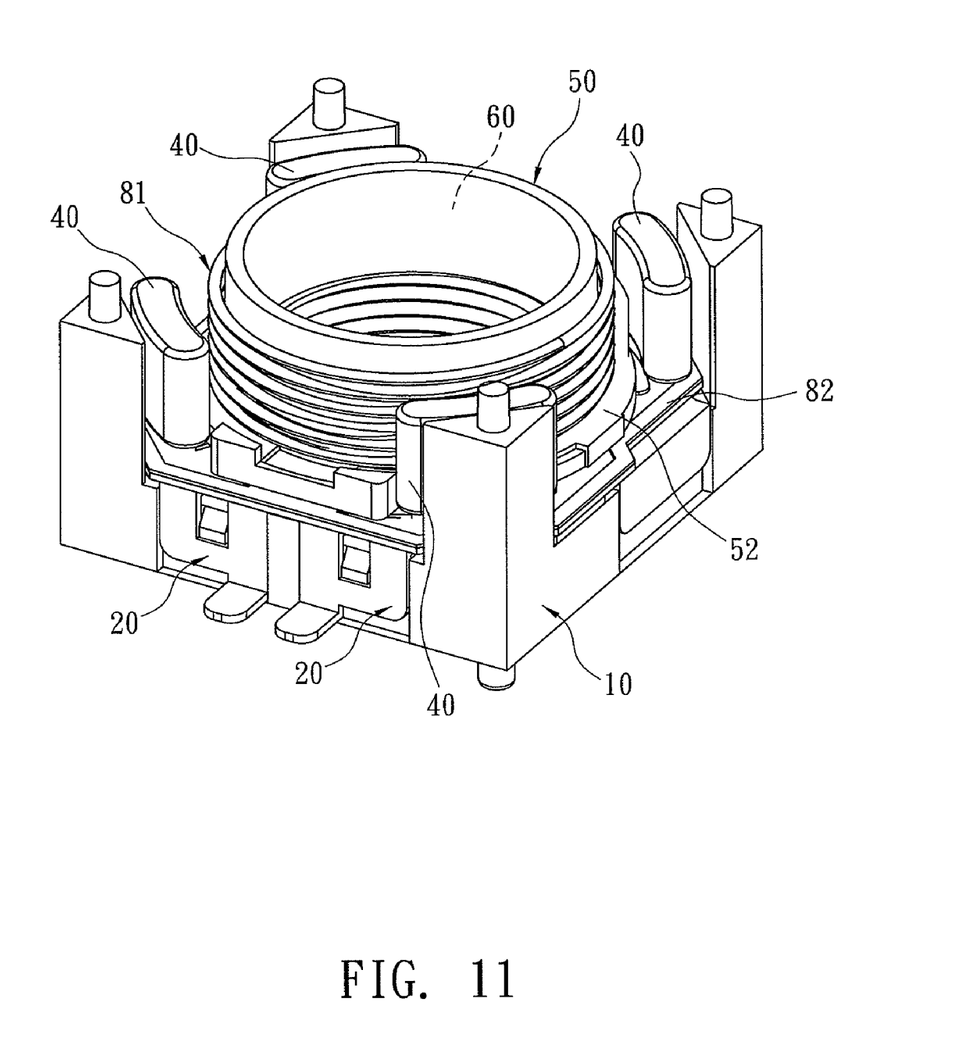
Figure 13:
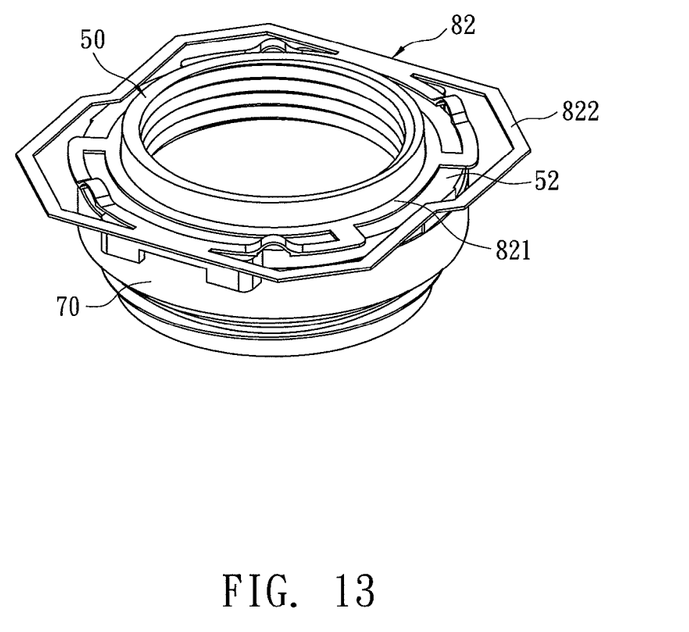
FIG. 13 is a bottom view of the embodiment in FIG. 3 with the assembled leaf spring and the lens holder.

Refer to FIG. 4, FIG. 11 & FIG. 14, the spring set 80 is at least including a coil spring 81 and a leaf spring 82, wherein the coil spring 81 of the spring set 80 is enclosed the outer surface of the lens holder 50 and is elastically supported between the outer circular flange 52 of the lens holder 50 and the top cover 90. As shown in FIG. 4, FIG. 8 & FIG. 14, the leaf spring 82 of the spring set 80 includes the inner circle 821 and the outer circle 822 connected with each other. The inner circle 821 is fixed on the lens holder 50 while the outer circle 822 is attached on the insulation spacer 30. In this embodiment, as shown in FIG. 13, the inner circle 821 is clipped and fixed on the outer surface of the bottom of the lens holder 50 while the outer circle 822 is fixed on the insulation spacer 30, keeping still. According to structure character of the leaf spring 82, it generates elastic force by the drawing and extension between the inner circle 821 and the outer circle 822 after the inner circle 821 and the outer circle 822 being set. The lens set having the lens holder 50, the optical lens 60 and the coil 70 is moved for focusing by a net force of the electromagnetic force, the elastic force of the coil spring 81 and the elastic force of the leaf spring 82. Because the coil spring 81 and the leaf spring 82 are springs in series so that the force is equal to a total of their spring constant. Thus besides the influence of each single elastic force is reduced, the direction of the springs 81, 82 toward the lens holder 50 is depending on contacting area. Thus an action acted on a single point by a single spring is improved and the tilt of the lens set during moving processes is reduced. Moreover, the elastic force of the coil spring 81 and the elastic force of the leaf spring 82 form a resultant force of the so as to overcome the problem of slow movement caused by insufficient displacement or insufficient elastic force of the leaf spring 82.

Figure 12:
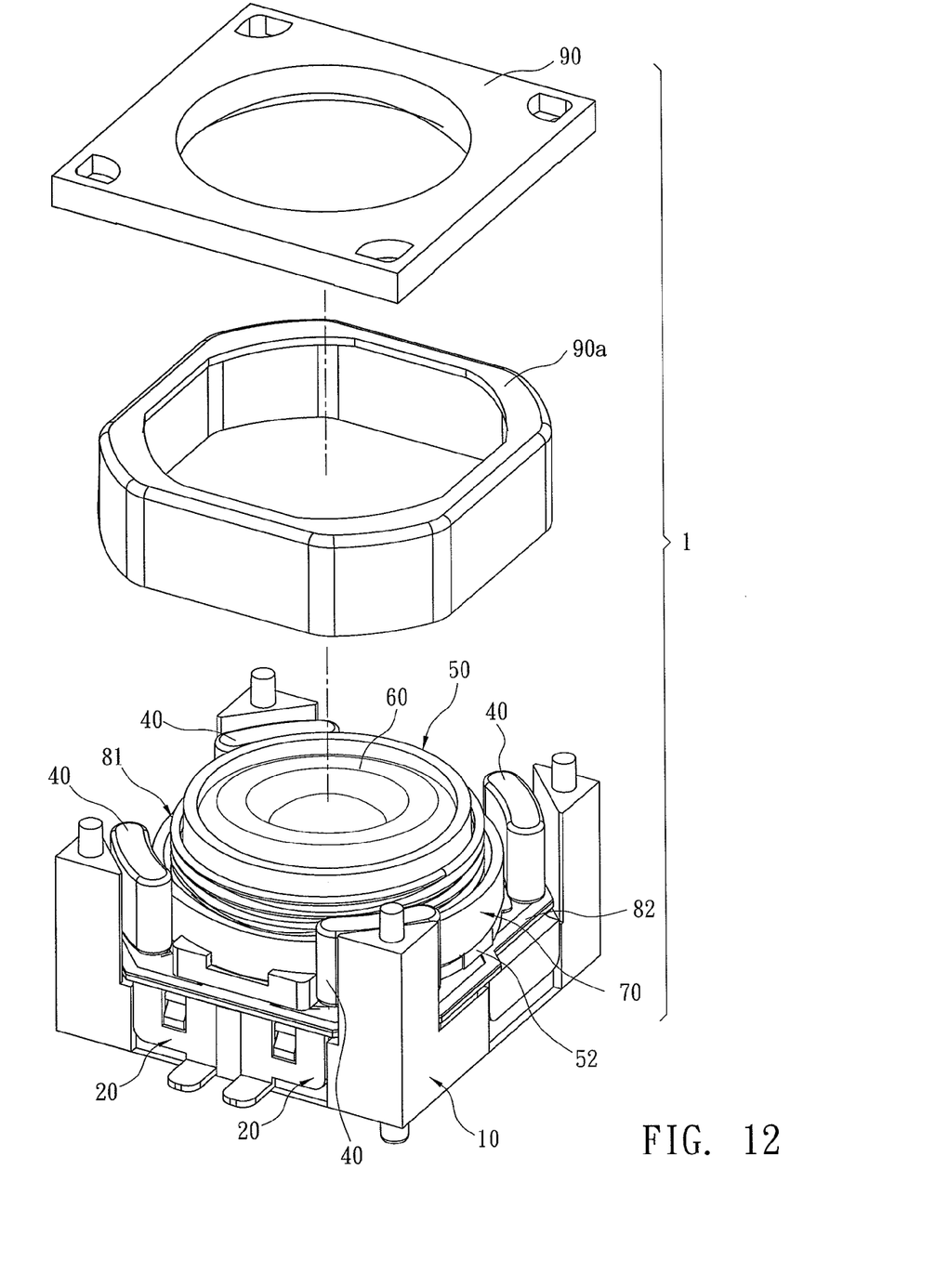

Refer to FIG. 4, FIG. 12 & FIG. 14, the coil 70 is disposed around the coil spring 81 and is fixed on the outer circular flange 52 of the lens holder 50, together with the lens holder 50 to form a connecting member (lens set). In this embodiment, the lens module further includes a top ring cover 90a that is disposed under the top cover 90 so that the four permanent magnets 40 are respectively mounted and fixed on inner edges of four corners of the top ring cover 90a. Then the top cover 90 is fastened on the four stands 11 of the base 10. Thus the top ring cover 90a is clipped between the top cover 90 and the base 10 and a lens module 1 is formed. And the four permanent magnets 40 are disposed between the inner surface of the top ring cover 90a and the insulation spacer 30.

In this embodiment, the lens holder 50, the optical lens 60, the coil spring 81, the leaf spring 82 and the coil 70 are assembled in turn, as shown from FIG. 8 to FIG. 12. Yet there is no limit on the sequence of assembly. For example, the optical lens 60 and the coil 70 are assembled with the lens holder 50. Or as shown in FIG. 13, the leaf spring 82 is disposed on one end of the lens holder 50 in advance and then the lens holder 50 is assembled with the insulation spacer 30.

Furthermore, the electrodes and current on head and tail of the coil 70 can be changed. An upward/downward (forwards/backwards) electromagnetic force is generated by the he coil 70, together with the N and S poles of the permanent magnets 40 so as to drive the lens set and inner circle 821 of the leaf spring 82 moving upwards/downwards (forwards/backwards) for focusing. The coil spring 81 of the spring set 80 is a compression spring. When the top cover 90 integrates with the base 10, the coiled spring 80 in compressed status presses the lens holder 50 to move downward. By the spring force of the spring set 80, the lens set having the lens holder, the optical lens 60 and the coil 70 stops on "dead point" during the movement and this is the far focus position. In this embodiment, the generated electromagnetic force between the coil 70 and the permanent magnet 40 is selected to be forwardly. Thus while in the far focus position, the coil 70 is not applied with current and no electromagnetic force is generated so that the lens set stays on the lower (rear) dead-center position without being affected by the electromagnetic force. While performing focusing, certain amount of current is controlled and applied to the coil 70 for generating a proper electromagnetic force that drives the lens set to move upward (forward) and stop at close focus position. When the electromagnetic force acted on the lens set equals to the elastic force of the spring set 80, the lens set stays on that position. That means the lens set moves from the far focus position to the close focus position upward (forward) by the electromagnetic force while the lens set turns back to the far focus position downward (backward) by restoring force of the spring set 80. Thus the zoom in/zoom out focusing is achieved.

The Second Embodiment

Figure 15:
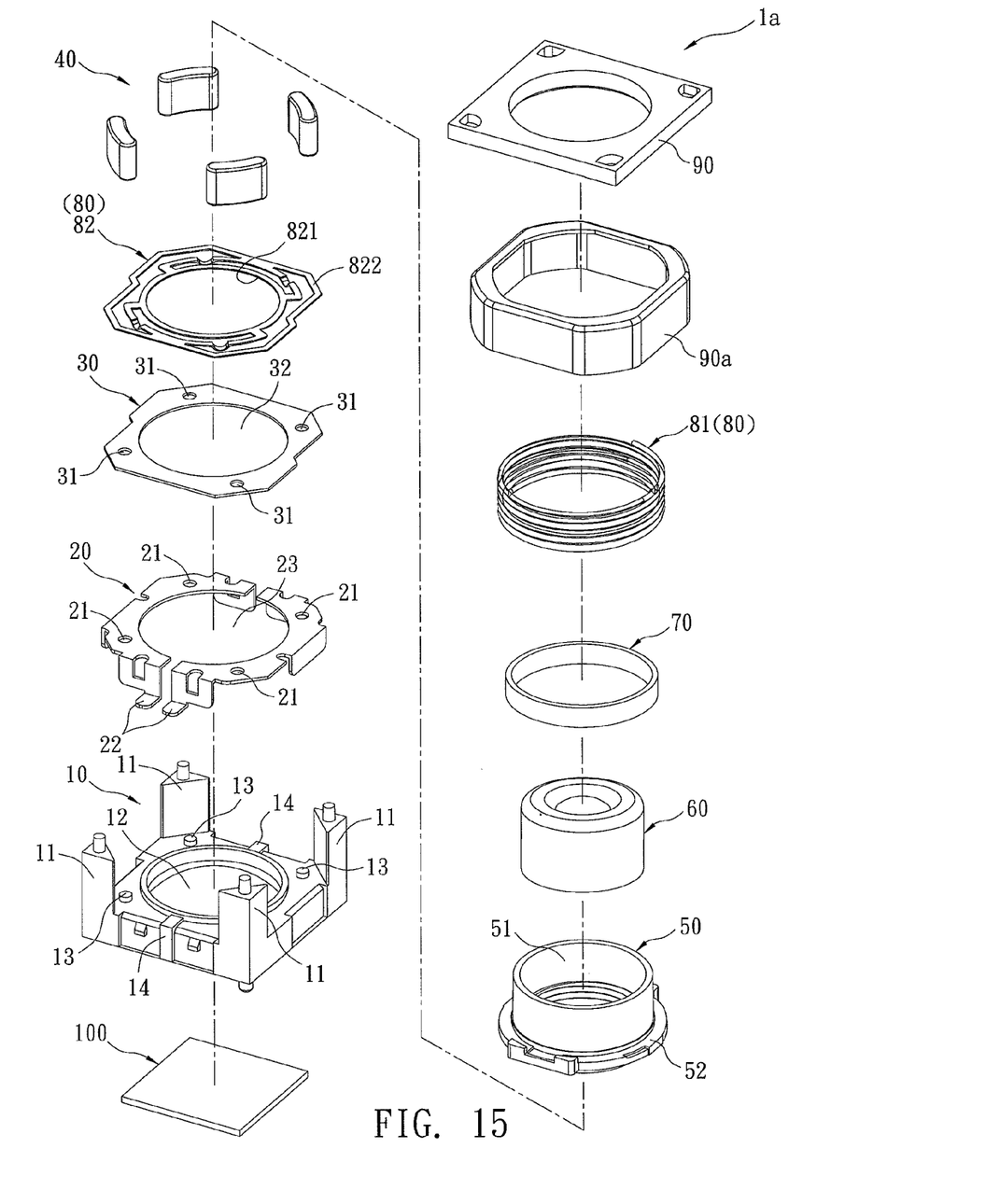
FIG. 15 is an explosive view of another embodiment according to the present invention.

Refer to FIG. 15, the structure of the lens module 1a in this embodiment is similar to that of the lens module 1 of the above embodiment. The difference between them is in that the coil spring 81 of the lens module 1a is around the coil 70 while the coil spring 81 of the lens module 1 is arranged on the inner side of the coil 70.

Compared with conventional lens modules, the spring set 80 of the lens modules 1, 1a of the present invention consist of a coil spring 81 and a leaf spring 82. Besides serial in line of the two springs, the lead spring 82 is used to correct the possible tilt generated while the coil spring 81 moves. Moreover, the coil spring 81 compensates unstable spring force of the leaf spring 82. Through the interaction between the resultant force of spring forces and the electromagnetic force, the lens module moves stably and fast and the tilt is reduced.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A voice coil driving auto-focus lens module comprising a base, two conductive plates, an insulation spacer, four permanent magnets, a lens holder, an optical lens, a spring set, a coil, and a top cover, wherein:

the base having four stands for locking on four corners for assembling with the top cover, a central hole on center thereof that forms an opening for an optical path of the optical lens and a plurality of positioning pins arranged on inner surface thereof;

the two conductive plates respectively being disposed on the base in insulated status by the assembling of the positioning hole with the positioning pins and a central hole corresponding to the central hole of the base is formed between the two conductive plates;

the isolation spacer attached on the two conductive plates by assembling of positioning holes thereof with the positioning pins of the base, and disposed with a central hole;

the permanent magnets in arched symmetrical shape and respectively disposed on inner side of the four stands of the base;

the lens holder that is a circular body having a central hole, and an outer circular flange;

the optical lens that is fixed in the central hole of the lens holder;

the spring set having a coil spring and a leaf spring;

the coil fixed on the outer circular flange of the lens holder while a head and a tail thereof are connected to different electrodes of the two conductive plates;

a top cover covered on and locked with the base;

wherein the lens holder, the optical lens and the coil form are assembled to form a lens set that moves synchronously;

the coil spring is disposed around the optical lens on the outer circular flange of the lens holder and is elastically supported between the outer circular flange of the lens holder and the top cover while the leaf spring having an inner circle that is fixed on the lens holder, and an outer circle connected with and inner circle remains still; and by the resultant force of spring forces of the coil spring as well as the leaf spring, together with an electromagnetic force generated between the coil with current and the permanent magnet, the lens set moves to focus.

2. The device as claimed in claim 1, wherein the coil spring is disposed on an inner side of the coil.

3. The device as claimed in claim 1, wherein the coil spring is disposed on an outer side of the coil.

4. The device as claimed in claim 1, wherein the coil spring is an extension coil spring.

5. The device as claimed in claim 1, wherein the coil spring is a compression coil spring.

6. The device as claimed in claim 1, wherein the lens module further includes a top ring cover disposed under the top cover so that the four permanent magnets are respectively fixed on inner edges of four corners of the top ring cover and the top cover is fastened on the four stands of the base so that the top ring cover is clipped between the top cover and the base while the four permanent magnets are disposed between an inner surface of the top ring cover and the insulation spacer.

\* \* \* \* \*